(12) United States Patent
Suzuki

(10) Patent No.: US 7,368,706 B2
(45) Date of Patent: May 6, 2008

(54) LIGHT SCANNING DEVICE

(75) Inventor: Yoshiyuki Suzuki, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 9 days.

(21) Appl. No.: 11/434,280

(22) Filed: May 16, 2006

(65) Prior Publication Data

US 2007/0023620 A1    Feb. 1, 2007

(30) Foreign Application Priority Data

Jul. 26, 2005    (JP) .............................. 2005-216541

(51) Int. Cl.
*H01J 3/14* (2006.01)
*G01J 1/32* (2006.01)

(52) U.S. Cl. ...................... 250/235; 250/205

(58) Field of Classification Search ................ 250/234, 250/559.06, 559.13, 227.26, 205, 235, 214 R; 359/204, 216; 347/238, 244
See application file for complete search history.

(56) References Cited

U.S. PATENT DOCUMENTS 6,172,787 B1 *    1/2001    Naiki ........................ 359/204

FOREIGN PATENT DOCUMENTS

JP    A-2002-131662    5/2002

* cited by examiner

*Primary Examiner*—Que Tan Le
*Assistant Examiner*—Don Williams
(74) *Attorney, Agent, or Firm*—Morgan, Lewis & Bockius LLP

(57) ABSTRACT

A light scanning device, including a light source including plural light emitting elements arranged linearly, a deflection section that deflects plural light beams emitted from the light source to scan a surface to be scanned, a photosensor that receives at least one of the plural light beams that are deflected by the deflection section, a signal generation section that generates a signal when a light energy amount received at the photosensor reaches a predetermined amount, and a control section that starts scanning of the surface to be scanned by each light beam after a predetermined amount of time passes from a point in time when the signal is generated by the signal generation section, the light receiving surface of the photosensor being inclined to receive light beams emitted from at least two light emitting elements among the plural light emitting elements, is provided.

14 Claims, 10 Drawing Sheets

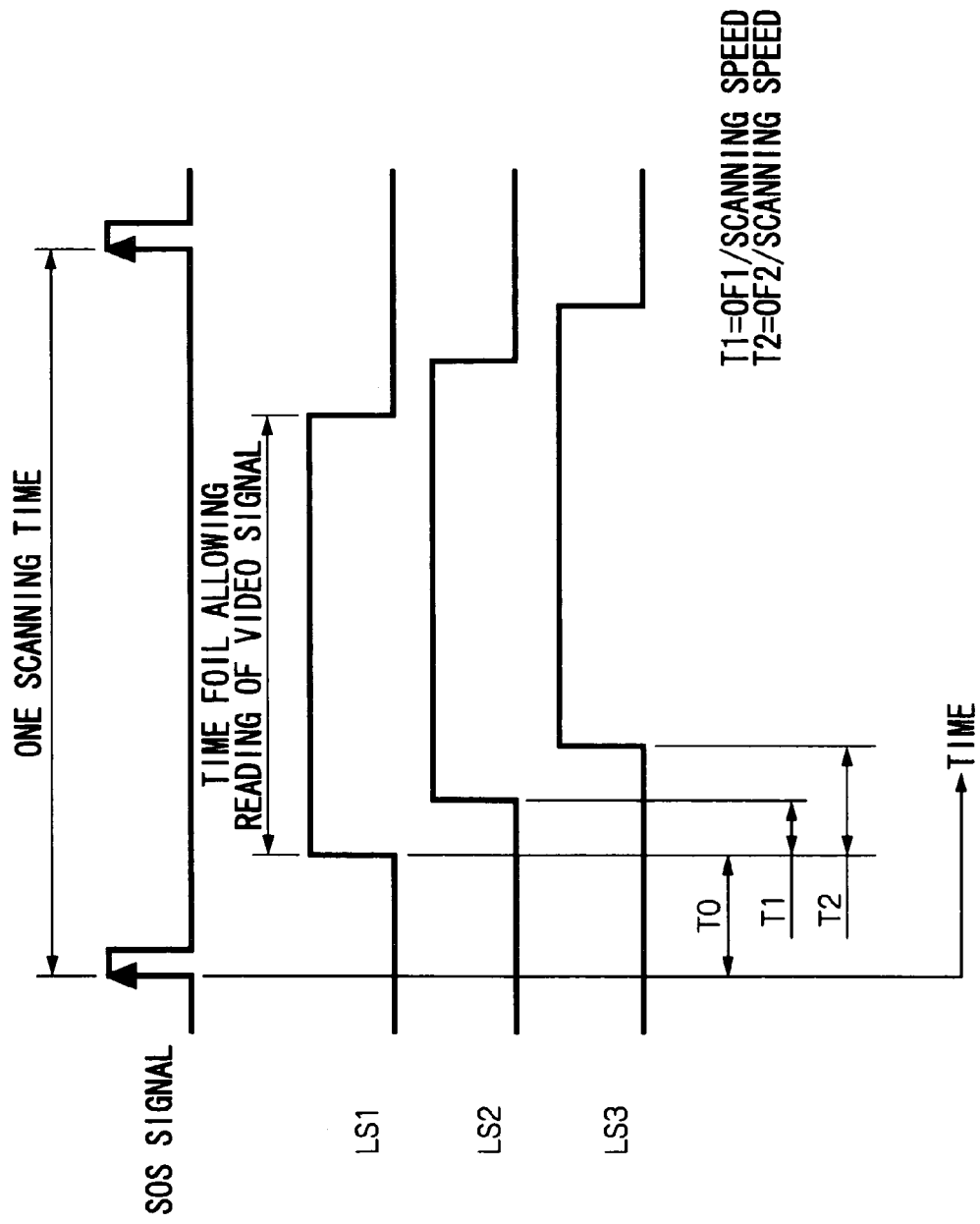

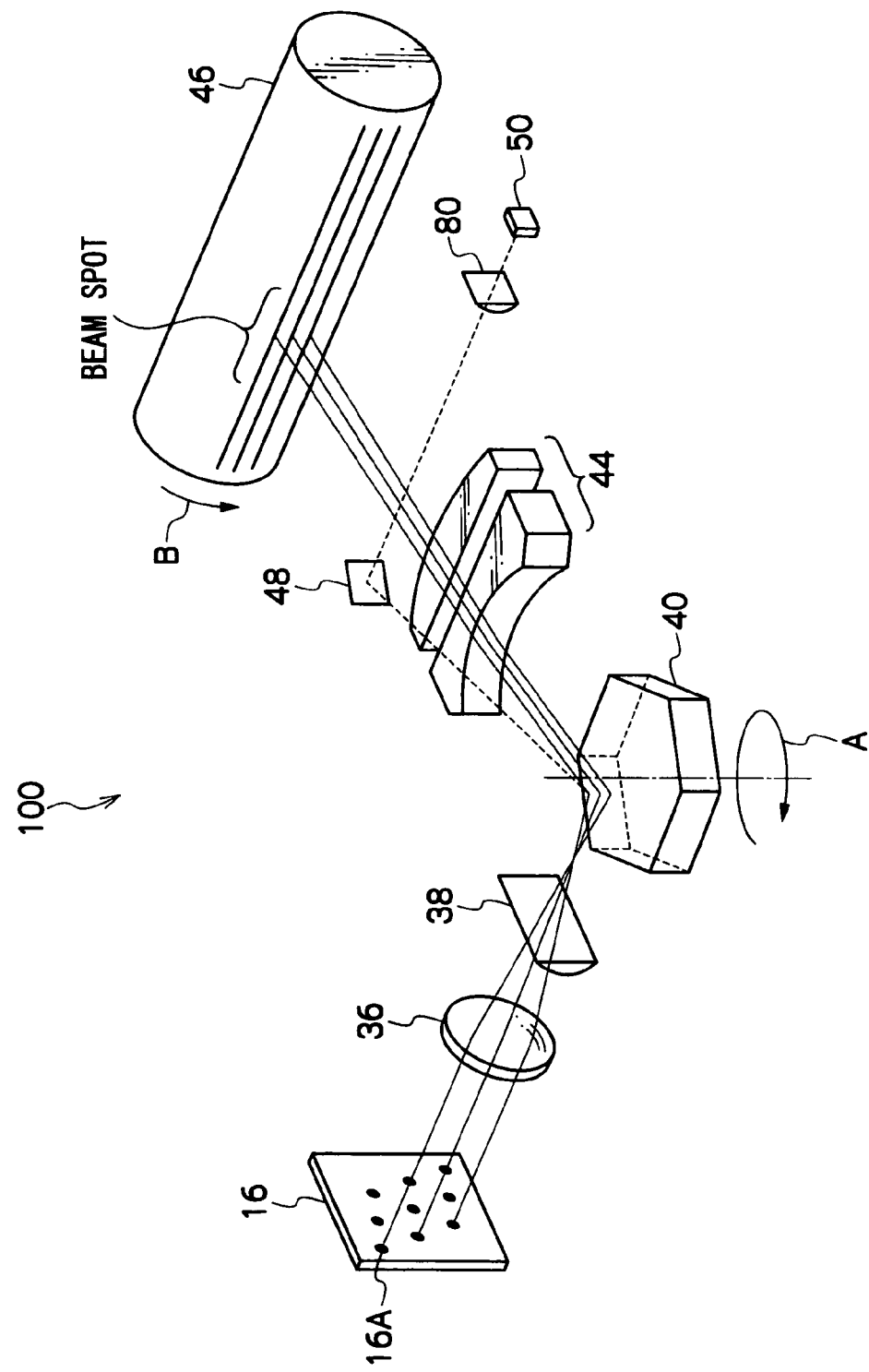

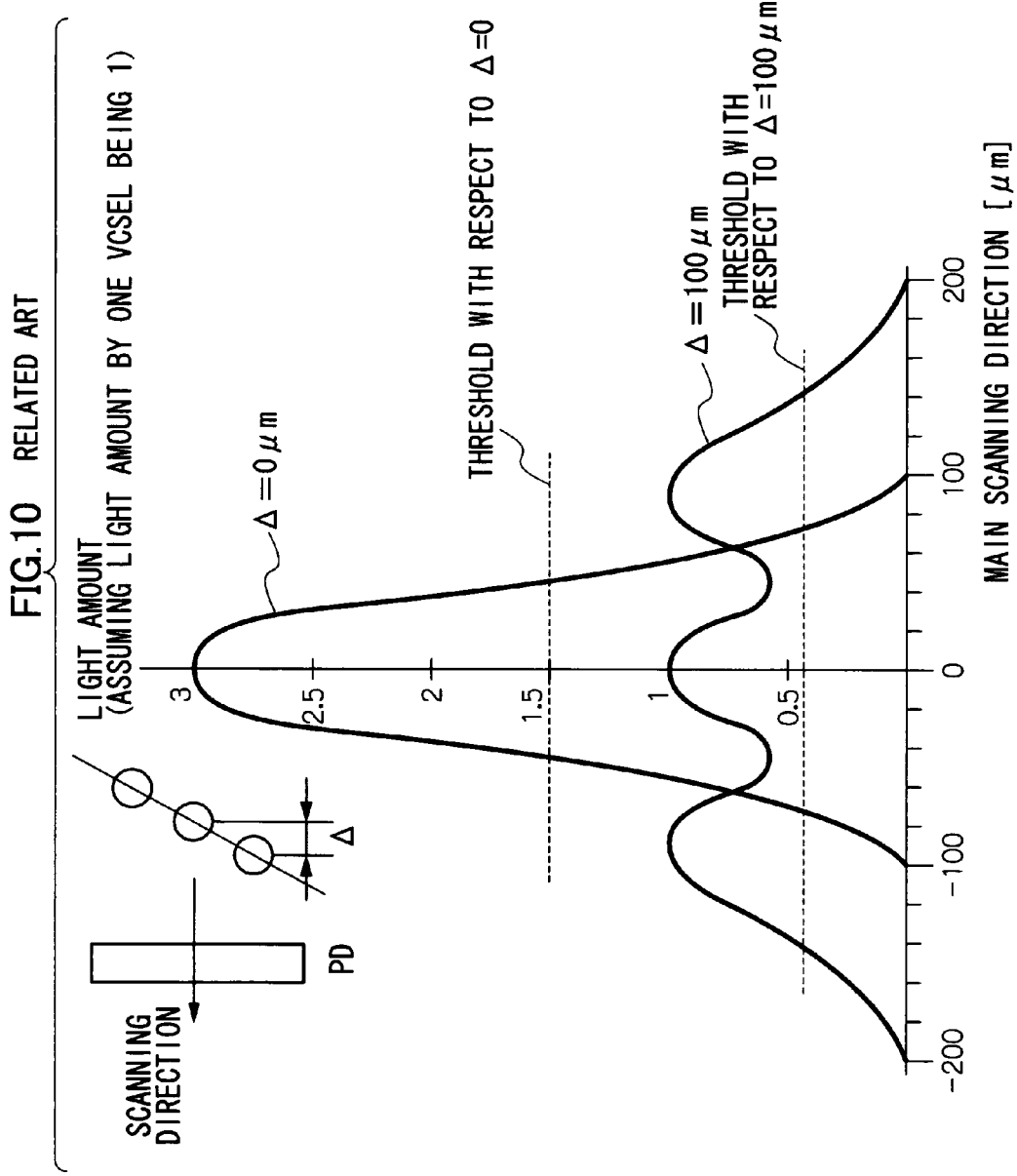

LIGHT SCANNING DEVICE

CROSS-REFERENCE TO RELATED APPLICATION

This application claims priority under 35 USC 119 from Japanese Patent Application No. 2005-216541, the disclosure of which is incorporated by reference herein.

BACKGROUND

1. Technical Field

The present invention relates to a light scanning device for scanning a surface to be scanned by deflecting plural light beams emitted from a light source by a deflection section.

2. Related Art

In an image forming device in an electronographic system, for high resolution and high speed, a light scanning device has been widely used, which simultaneously emits plural light beams from a light source in which plural light emitting elements such as a semiconductor laser is arranged two-dimensionally and deflects them on the same deflection surface to scan a photoreceptor at the same time by plural light beams simultaneously. In addition, as a light source of this light scanning device, a Vertical Cavity Surface Emitting Laser (a so-called VCSEL) has been widely used because of its high degree of freedom in arrangement of the semiconductor laser and low manufacturing cost.

In the light scanning device, generally, a photodetector is arranged so that light beam at starting of a main scanning can enter upon. This photodetector generates a scanning onset signal (hereinafter, called as a SOS signal) in accordance with timing of detection of the scanned beam and a driving circuit of a light source controls a start position of the main scanning based on a SOS signal generated by the photodetector.

As shown in FIG. 9, as a photodetector, one configured by a photodiode applying a current depending on a light incident amount, an amplifier OP for perform I (current)/V (voltage) conversion by amplifying the inputted current, a threshold power source SP for generating a voltage indicating a threshold, and a comparator CP for comparing each output voltage of the amplifier OP and the threshold power source SP has been widely known. In this photodetector, the SOS signal is made a high level when the output voltage of an amplifier OP is not less than a threshold.

It is general that a single mode oscillation (oscillation in a single wave length) is required for the light scanning device in order to obtain a minute beam spot, however, if the single mode oscillation is made in the VCSEL, there is a tendency that the light emission output is small. Therefore, in the case of scanning a photodiode PD by lighting only one VCSEL, the light energy amount received by the photodiode PD is small. So it may be required that the amplification gain of the photodiode PD is increased or the threshold voltage is decreased. However, in this case, this makes the scanning easily affected by the noise. Therefore, a method to increase a light energy amount received by the photodiode PD by lighting plural VCSELs of which positions in the main scanning directions are close to each other and scanning the photodiode PD is devised.

According to this method, when there is no displacement in the positions in the main scanning directions of plural VCSELs ($\Delta=0$ µm), plural light beams emitted from the plural VCSELs at the same time enters the photodiode PD at the same time, so that, as shown in a graph of FIG. 10, a received light energy profile is formed, which has one rising and one falling and has the maximum value larger than the light emission energy amount of each VCSEL. Therefore, there are only two cross points between the received light energy profile and an energy level corresponding to a threshold vale of generation of a SOS signal without raising the amplification gain of the photodiode PD or lowering the threshold voltage, and this makes it possible to generate a SOS signal stably. Further, the graph of FIG. 10 shows a received light energy profile in a main scanning direction in the photodiode PD when three VCSELs having Gaussian distribution with a beam diameter of 60 µmare lighted at the same time to scan the photodiode PD.

However, if there is a displacement in the positions of the main scanning directions of plural VCSELs ($\Delta=100$ µm), there is a difference in times that plural light beams emitted from the plural VCSELs at the same time enter the photodiode PD. Therefore, as shown in the graph of FIG. 10, rising and falling are repeated for each light beam and the received light energy profile of which the maximum value is substantially equivalent to the light emission energy amount of each VCSEL is formed. Therefore, in order to make only two cross points between the received light energy profile and the energy level corresponding to the threshold vale of generation of the SOS signal, the amplification gain of the photodiode PD should be increased or the threshold voltage should be increased, and this makes the affect of the noise easy to receive.

SUMMARY

An aspect of the invention is a light scanning device including: a light source including plural light emitting elements that are arranged linearly; a deflection section that deflects plural light beams emitted from the light source to scan a surface to be scanned; a photosensor that receives at least one of the plural light beams that are deflected by the deflection section; a signal generation section that generates a signal when an amount of light energy received at the photosensor reaches a predetermined amount; and a control section that starts scanning of the surface to be scanned by each light beam after a predetermined time passes from a point in time when the signal is generated by the signal generation section; wherein a light receiving surface of the photosensor is inclined so as to receive light beams emitted from at least two light emitting elements among the plural light emitting elements.

BRIEF DESCRIPTION OF THE DRAWINGS

Exemplary embodiments of the invention will be described in detail with reference to the following figures, wherein:

FIG. 4A is a front view; FIG. 4B is a side view; and FIG. 4C is a plan view;

FIG. 6 is a timing chart showing the state of a substantial part signal of the exposure control section according to a second exemplary embodiment;

FIG. 7 is a perspective view showing a light scanning device according to the second exemplary embodiment;

FIG. 8A is a front view; FIG. 8B is a side view; and FIG. 8C is a plan view;

FIG. 10 is a graph showing a received light energy amount profile on a light receiving face of a conventional light scanning device.

DETAILED DESCRIPTION

With reference to the drawings, the exemplary embodiments of the invention will be described below.

First Exemplary Embodiment

Figure 1:
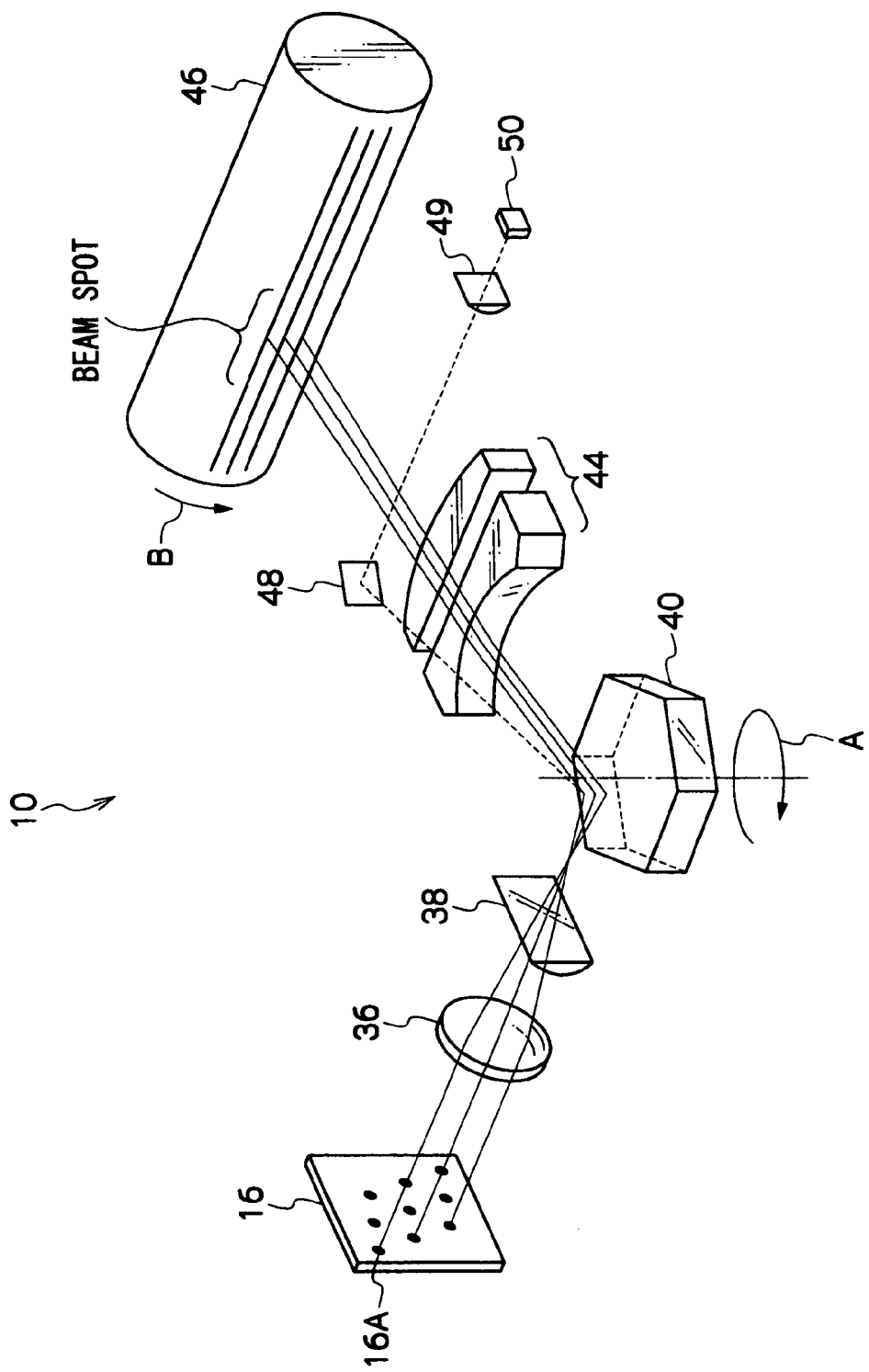
FIG. 1 is a perspective view showing a light scanning device according to a first exemplary embodiment.

As shown in FIG. 1, a light scanning device 10 according to the first exemplary embodiment is provided with a VCSEL array 16 having plural VCSELs 16A arranged two-dimensionally. At the side of light emission of the VCSEL array 16, a collimator lens 36, a cylindrical lens 38, and a polygon mirror 40 are disposed in that order, and further, at the side of light deflection of the polygon mirror 40, an fθ lens 44 and a photoreceptor 46 are disposed in that order.

The laser beams emitted from the VCSEL array 16 are made to be approximately parallel beam by the collimator lens 36. This laser beam is converged in the sub scanning direction by the cylindrical lens 38 to be focused on a reflection surface of the polygon mirror 40. Then, it is deflected by the rotation of the polygon mirror 40 to be imaged on the photoreceptor 46 via the fθ lens 44. Further, the main scanning is carried out by rotation in an arrow A direction of the polygon mirror 40 and the sub scanning is carried out by rotation in an arrow B direction of the photoreceptor 46.

On the other hand, a reflection mirror 48 is provided at a position where the main scanning is started by the laser beam. Further, in the reflection direction of this reflection mirror 48, a lens 49 having a positive power in the sub scanning direction and a photosensor 50 configured by a photodiode are provided so that the laser beam when the main scanning is started enters the photosensor 50 passing through the lens 49. Then, in accordance with incidence of the laser beam in the photosensor 50, a SOS signal is generated by a photodetector for a SOS signal detection 52 (refer to FIG. 5) which will be described later.

Figure 9:
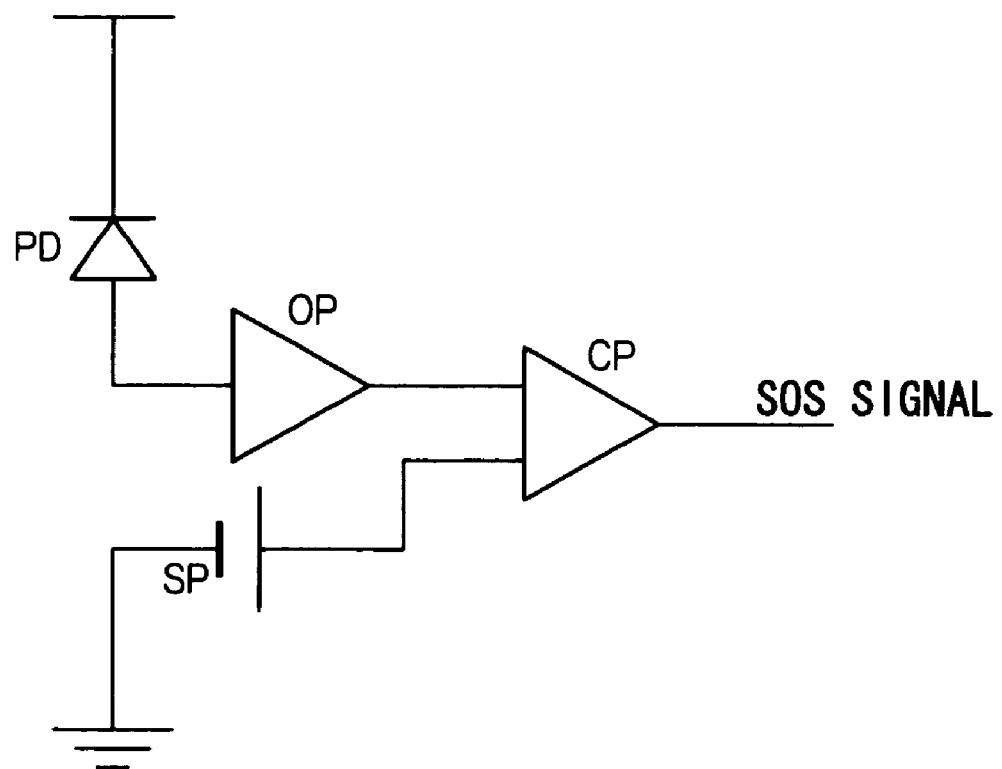
FIG. 9 is a circuit diagram showing a circuit configuration example of a photodetector.

The photodetector for SOS signal detection 52 according to this exemplary embodiment is configured in the same way as the photodetector shown in FIG. 9. Here, the photodiode PD shown in FIG. 9 corresponds to the photosensor 50 of this exemplary embodiment.

In addition, the reflection surface of the polygon mirror 40 and the light receiving surface 50A of the photosensor 50 are in a conjugate relation. Even if optical surface tangle of the reflection surface of the polygon mirror 40 occurs, the incidence position of the light beam in the light receiving surface 50A of the photosensor 50 is not shifted in the sub scanning direction.

Figure 2:
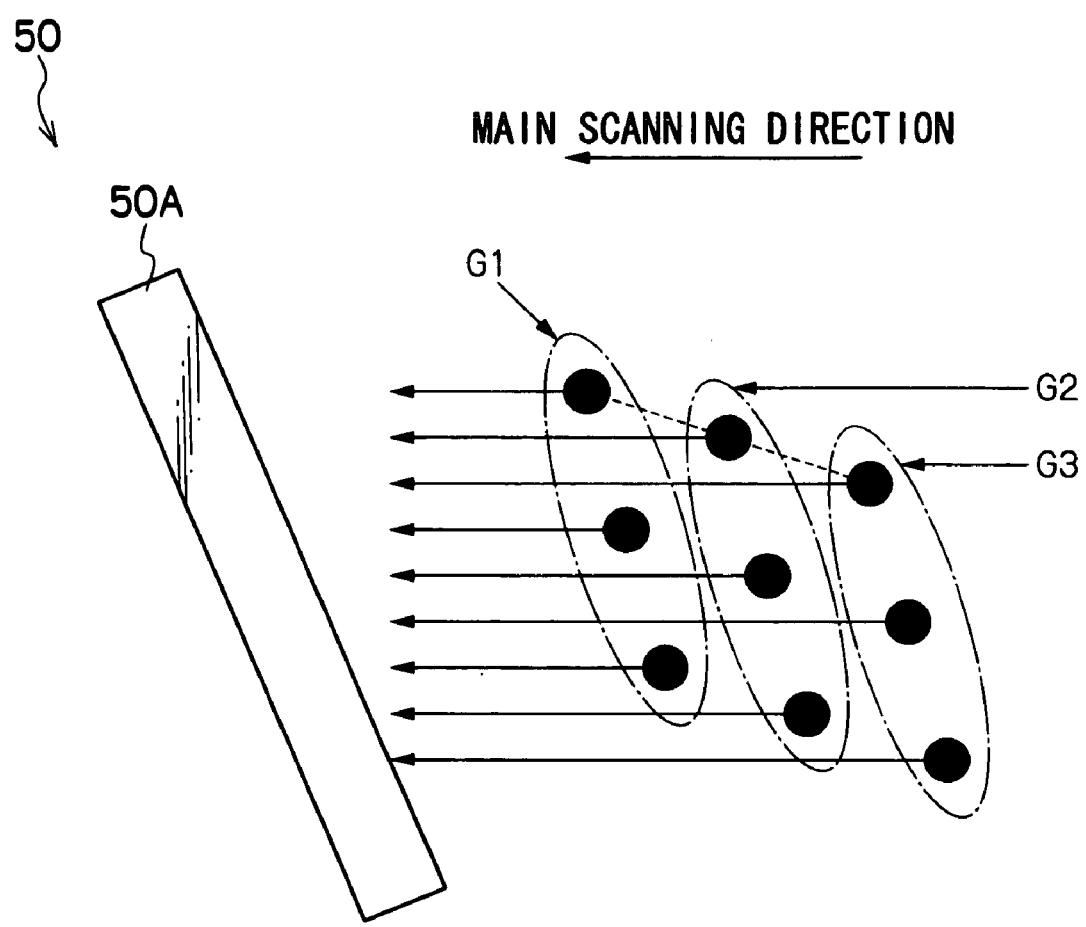
FIG. 2 is a schematic diagram explaining the operation of the light scanning device according to the first exemplary embodiment.

As shown in FIG. 2, in the light scanning device 10 according to this exemplary embodiment, the photosensor 50 is scanned in a state of a VCSEL group (hereinafter, referred to as "a SOS detection group") being lighted, the group emitting light beams which beam spots formed on the photoreceptor 46 are arranged linearly, and then, the SOS signal is generated in accordance with the output from the photosensor 50 depending on the scanning.

As shown in FIG. 1 and FIG. 2, the plural VCSELs 16A (for example, three as shown in FIG. 2) configuring the SOS detection group are arranged on a line inclined toward a side of the downstream of the main scanning direction (a direction parallel to a surface(s) at which each members are disposed shown in FIG. 1) with respect to the sub scanning direction (a direction perpendicular to the surface(s) at which each members are disposed shown in FIG. 1). The photoreceptor 46 is scanned by row of the light beams inclined to the downstream of the main scanning direction with respect to the sub scanning direction. On the other hand, the light receiving surface 50A of the photosensor 50 is scanned by row of the light beams inclined toward the upstream of the scanning direction in the light receiving surface 50A with respect to the sub scanning direction. Further, since the light beams are reflected by the reflection mirror 48 to enter the light receiving surface 50A of the photosensor 50, in the photoreceptor 46 and the light receiving surface 50A of the photosensor 50, the scanning directions thereof are inverted and the inclined directions thereof with respect to the sub scanning direction of the row of the light beams to be scanned are inverted.

Here, as shown in FIG. 2, the light receiving surface 50A of the photosensor 50 is formed in the shape of a rectangle in which a direction inclined toward the side of the upstream in the scanning direction on the light receiving surface 50A with respect to the sub scanning direction is a longitudinal direction. In addition, the longitudinal direction of the light receiving surface 50A and the rows of the VCSELs 16A are made to be parallel to each other. In other words, an edge at the side of the upstream of the scanning direction of the light receiving surface 50A is made to be parallel to the row of the VCSELs 16A. Therefore, as compared to a case in which the longitudinal direction of the light receiving surface 50A of the photosensor 50 is made to be parallel to the sub scanning direction, there is a smaller difference in timings that the plural light beams emitted from the plural VCSELs 16A configuring the SOS detection group enter the light receiving surface 50A of the photosensor 50.

Figure 3:
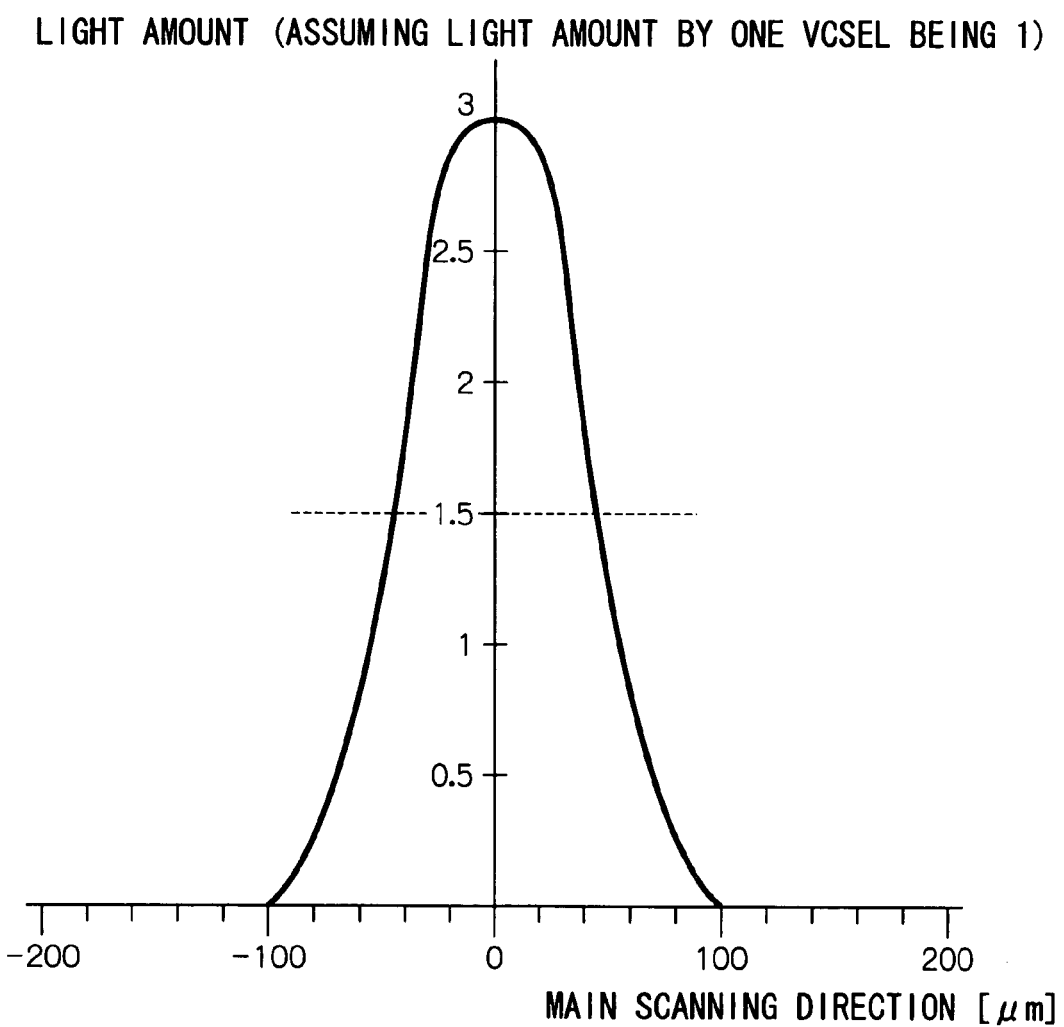
FIG. 3 is a graph showing a received light energy amount profile on a light receiving surface of a photosensor of the light scanning device according to the first exemplary embodiment.

Thereby, in the case of lighting the all of the plural VCSELs 16A configuring the SOS detection group, as shown in the graph of FIG. 3, there is a small difference in timings of rising and falling for respective light beams, and the received light energy profile of which maximum value is larger than the light emission energy amount of each VCSEL 16A is formed on the light receiving surface 50A of the photosensor 50. As a result, it is possible to have two cross points between the received light energy profile and the energy level corresponding to the threshold for generating the SOS signal without raising the amplification gain of the photodiode PD or lowering the threshold voltage.

Particularly, since the edge at the side of the upstream in the scanning direction of the light receiving surface 50A is made to be parallel to the row of the VCSELs 16A, plural light beams emitted from the plural VCSELs 16A enter the light receiving surface 50A of the photosensor 50 at the same time. Thereby, a received light energy profile having rising and falling once, of which maximum value is plural times (for example, three times as shown in the drawing) as the light emission energy amount of each VCSEL is formed.

Accordingly, the stable SOS signal that is not easily affected by the noise can be generated by the photodetector for SOS signal detection 52, so that the accuracy for the control of the scanning start position in the main scanning direction at the photoreceptor 46 can be improved.

In addition, as shown in FIG. 1, the reflection surface of the polygon mirror 40 and the light receiving surface 50A of the photosensor 50 are in a conjugate relation by the lens 49 disposed between the polygon mirror 40 and the photosensor 50 and having the positive power in the sub scanning direction. As a result, even if the surface tangle of the reflection surface of the polygon mirror 40 occurs, the incidence position of the light beams to the light receiving surface 50A of the photosensor 50 is not shifted to the sub scanning direction.

Figure 4A:
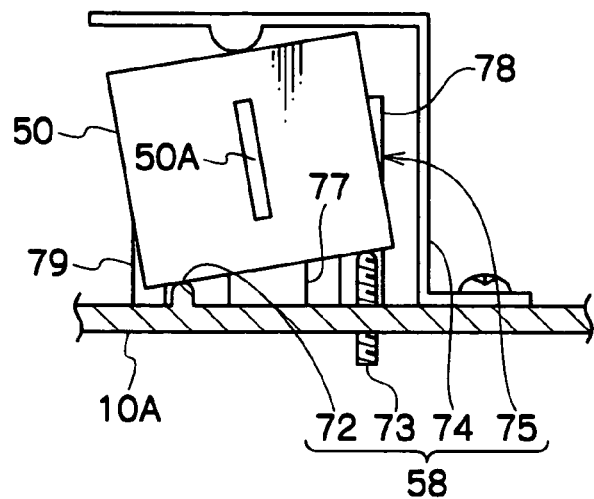
FIGS. 4A, 4B, and 4C show a sensor adjusting mechanism of the photosensor of the light scanning device according to the first exemplary embodiment.
Figure 4B:
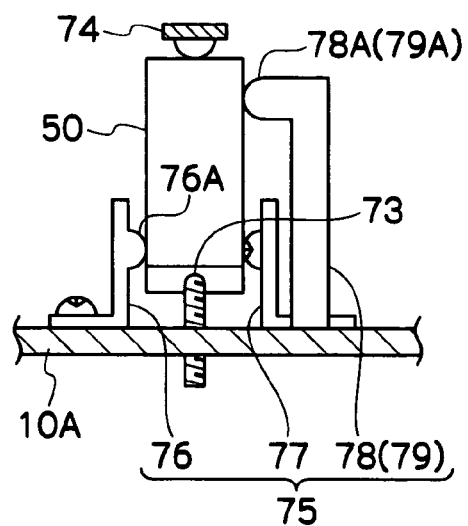
Figure 4C:
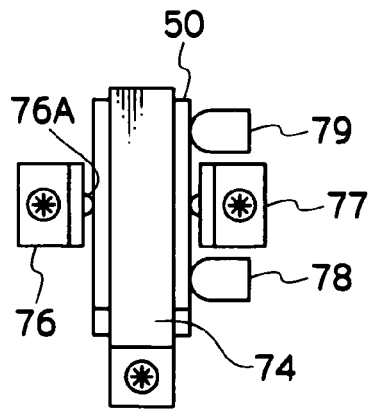

In addition, as shown in FIGS. 4A to 4C, the photosensor 50 is supported by a sensor adjusting mechanism 58 on a bottom surface 10A of a light scanning device housing so as to be adjusted capable of rotating around an optical axis. The sensor adjusting mechanism 58 is configured by a positioning projection 72 that projects from the bottom surface 10A and faces the lower left side of the photosensor 50, an adjustment screw 73 that projects from the bottom surface 10A and faces the lower right side of the photosensor 50, a plate spring 74 that abuts against the upper surface of the photosensor such that the photosensor 50 and the positioning projection 72 and the adjustment screw 73 are press-contacted, and a supporting mechanism 75 that supports the photosensor 50 so as to be unable to incline to the optical axial direction.

The supporting mechanism 75 is configured by a support chip 76 on which a positioning projection 76A is formed so as to face a center part at the lower side of the surface of the photosensor 50, a plate spring 77 that abuts against the center part at the lower side of the rear surface of the photosensor 50 such that the photosensor 50 and the positioning projection 76A are press-contacted, a supporting chip 78 on which a positioning projection 78A facing the right upper side of the rear surface of the photosensor 50 is formed, and a supporting chip 79 on which a positioning projection 79A facing the left upper side of the rear surface of the photosensor 50 is formed.

The photosensor 50 is supported in a sandwich manner by the positioning projection 76A and the plate spring 77 at the lower center parts. In addition, the lower center part of the photosensor 50 is biased from the rear side to the front side. When a moment from the front side to the rear side acts on the upper side of the photosensor 50, the right upper side of the rear surface and the left upper side of the rear surface of the photosensor 50 abut against the positioning projections 78A and 79A, respectively. Thereby, the photosensor 50 cannot be inclined to the light axial direction.

In addition, the photosensor 50 is supported in a sandwich manner by the positioning projection 72, the adjustment screw 73, and the platy spring 74 at the upper and lower surfaces thereof Here, the adjustment screw 73 can adjust the projection amount thereof from the bottom surface 10A and by adjusting the projection amount from the bottom surface 10A of the adjustment screw 73, the light receiving surface 50A of the photosensor 50 can be rotatably adjusted around the optical axis. Thereby, it is possible to suppress shifting of the incidence position of the light beam to the light receiving surface 50A of the photosensor 50 that is generated by the optical surface tangle of the reflection surface of the polygon mirror 40 or the like.

Here, as a cause of the positional displacements of the beam spot on the photoreceptor 46 and the light receiving surface 50A of the photosensor 50, an error of interval of the light emission points on the VCSEL array 16, an error of properties and an error of attaching positions in the light scanning device 10 may be conceived.

However, since the VCSEL array 16 is made by a semiconductor process, the error of intervals of the light emission points on the VCSEL array 16 is not serious. Further, with respect to the error of properties and the error of the attaching positions in the light scanning device 10, providing a mechanism for adjusting the attaching position in a condition in which each optical member is appropriately designed and manufactured, it is possible to obtain a beam spot position approximately as calculated although there is a positional displacement to some extent.

Therefore, in a case of generating a SOS signal using only one group (a G1 group) as shown in FIG. 2 as a SOS detection group, an image with a sufficient quality can be obtained when the light scanning device 10 is applied to the image forming device by adding or subtracting a timing correction time HT obtained by the following formula (1) to or from lighting timing of the light beam of the other gropes (here, a G2 group and a G3 group) that are offset from the SOS detection group in the main scanning direction so that the beam position offset in design is corrected with respect to timing derived on the basis of the generated SOS signal.

$$HT = OD/SS \qquad (1)$$

Where OD is a beam spot offset distance on the photoreceptor 46 and SS is a beam spot scanning speed on the photoreceptor 46.

Figure 5:
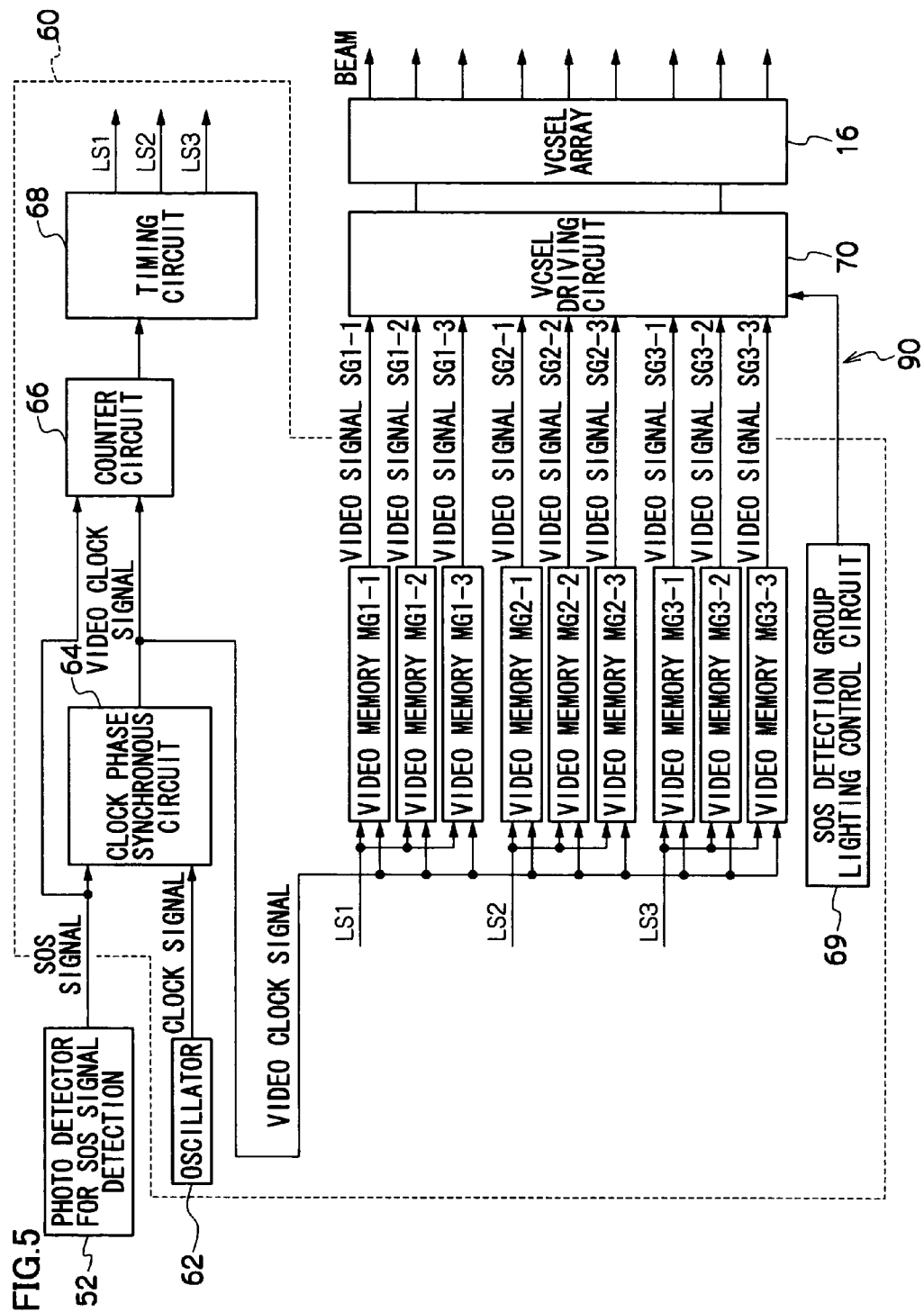
FIG. 5 is a block diagram showing the configuration of an exposure control section of the light scanning device according to the first exemplary embodiment.

FIG. 5 shows the configuration of an exposure control section 90 of the light scanning device 10 according to the first exemplary embodiment. Here, the VCSELs in the VCSEL array 16 are configured so as to correspond to the beam spots shown in FIG. 2, namely, the VCSELs in the VCSEL array 16 are configured in such a manner that three VCSEL groups each having three VCSELs arranged at approximately even intervals on a line along the sub scanning direction that is perpendicular to the main scanning direction are arranged, so that the sub scanning directional position of each VCSEL is displaced with each other, along the main scanning direction. Further, assuming that respective VCSEL groups are a G1 group, a G2 group, and a G3 group, the SOS signal is generated by the light beams from the VCSEL group only, which is the G1 group.

As shown in FIG. 5, the exposure control section 90 according to the first exemplary embodiment includes a photodetector for SOS signal detection 52, a video signal output circuit 60, and a VCSEL driving circuit 70.

As described above, the photodetector for SOS signal detection 52 is configured in the same way as the photodetector shown in FIG. 9.

The video signal output circuit 60 is configured by an oscillator 62, a clock phase synchronous circuit 64, a counter circuit 66, a timing circuit 68, plural video memories MG 1-1 to MG 3-3, and a SOS detection group lighting control circuit 69. Further, the video memories MG 1-1 to MG 1-3 correspond to respective VCSELs belonging to the G1 group, the video memories MG 2-1 to MG 2-3 correspond to respective VCSELs belonging to the G2 group, and the video memories MG 3-1 to MG 3-3 correspond to respective VCSELs belonging to the G3 group.

The SOS detection group lighting control circuit 69 outputs the signals, that can light all VCSELs belonging to SOS detection group (the G1 group according to this exemplary embodiment), to the VCSEL driving circuit 70 for a time period that the light beams can be incident to the reflection mirror 48. Thereby, plural light beams emitted from the VCSELs belonging to the SOS detection group are incident to the photosensor 50 and a SOS signal (refer to FIG. 6) depending on a light amount level of the plural light beams is generated by the photodetector for SOS signal detection 52.

In addition, in the video signal output circuit 60, the SOS signal generated by the photodetector for SOS signal detection 52 and a clock signal generated by the oscillator 62 are inputted in the clock phase synchronous circuit 64, and a video clock signal in synchronization with rising timing of the SOS signal is outputted.

To the counter circuit 66, the SOS signal and the video clock signal are inputted, in the counter circuit 66, a number of video clock is counted as the elapsed time from rising of the SOS signal, and a count signal indicating a count value is outputted to the timing circuit 68.

The timing circuit 68 generates an LS1 signal that becomes a high level when a time T0 shown in FIG. 6 has passed and becomes a low level after a predetermined time for allowing reading of video signal shown in FIG. 6 passed, on the basis of the count signal inputted from the counter circuit 66, and then, the timing circuit 68 output the signal.

Each of the video memories MG 1-1 to MF 3-3 is structured by a FIFO (First-In First-Out) memory, and, on the basis of the image data, a video signal for lighting each VCSEL beam that is transformed by a video signal processor (not illustrated) is stored.

When the LS1 signal becomes the high level, it is inputted in the video memories MG 1-1 to MG 1-3 corresponding to the respective VCSELs of the G1 group shown in FIG. 2 as a reading allowing signal, video signals SG 1-1 to SG 1-3 for the VCSELs belonging to the G1 group are outputted from the video memories MG 1-1 to MG 1-3 in synchronization with the video clock signal, and when each video signal is ON, the VCSEL driving circuit 70 lights the corresponding VCSELs.

Here, it is necessary to delay the lighting timings of the VCSELs belonging to the G2 group and the lighting timings of the VCSELs belonging to the G3 group in FIG. 2, with respect to the lighting timing of the VCSELs belonging to the G1 group, by amounts corresponding to an offset OF1 and an offset OF2 shown in FIG. 2 respectively.

As shown in FIG. 6, each delay time is obtained from the following formulas (2) and (3).

Delay time $T1$ of $G2$ group=$OF1$/scanning speed  (2)

Delay time $T2$ of $G3$ group=$OF2$/scanning speed  (3)

Therefore, in order to expose by the beams of the VCSELs belonging to each of the G2 group and the G2 group at a predetermined position, outputting a LS2 signal in which the LS1 signal is delayed by the delay time T1 and a LS3 signal in which the LS1 signal is delayed by the delay time T2 from the timing circuit 68, each signal is applied as "a video memory reading allowing signal of a G2 group" and "a video memory reading allowing signal of a G3 group".

Then, in the same way as the lighting order of the VCSELs belonging to the G1 group, the VCSEL corresponding to each video signal is lighted.

The VCSEL array 16 corresponds to the light source in an aspect of the invention; the VCSEL 16A corresponds to the light emitting element in the aspect of the invention; the photosensor 50 corresponds to the photosensor in the aspect of the invention, the photodetector for SOS signal detection 52 corresponds to the generation section in the aspect of the invention; and the SOS detection group lighting control circuit 69 corresponds to the control section in the aspect of the invention.

Further, the explanation of this exemplary embodiment is given assuming that the SOS detection group is a group which scans the photodetector at the earliest timing, however, the invention is not limited to this and even if the SOS detection group is defined as the other group, there is no problem if the timing circuit 68 is appropriately set.

In addition, the explanation of this exemplary embodiment is given assuming that the video memory reading allowing signal is delayed by the timing circuit 68 in unit of a video clock signal, however, the present invention is not limited to this and the beam spot position of the VCSELs belonging to the G2 group and the G3 group can be controlled with a higher degree of accuracy by providing a fine adjusting mechanism using delaying by an analog element or a logic gate.

In addition, the explanation of this exemplary embodiment is given assuming that the correction of the beam position offset with respect to the G2 group and the G3 group from the G1 group is made in accordance with a designed value, however, the invention is not limited to this and it is obvious that the invention is made so as to make the correction in accordance with a measured value.

Second Exemplary Embodiment

According to the first exemplary embodiment, the photosensor 50 is inclined to the downstream side in the main scanning direction with respect to the sub scanning direction so as to make the light receiving surface 50A of the photosensor 50 in parallel with the rows of the VCSELs 16A configuring the SOS detection groups. However, according to this exemplary embodiment, the light beams are incident to the light receiving surface 50A of the photosensor 50 after rotating the row of the light beams emitted from the VCSELs 16A configuring each SOS detection group around the optical axis to decrease an inclined angle with respect to the sub scanning direction.

Figure 8A:
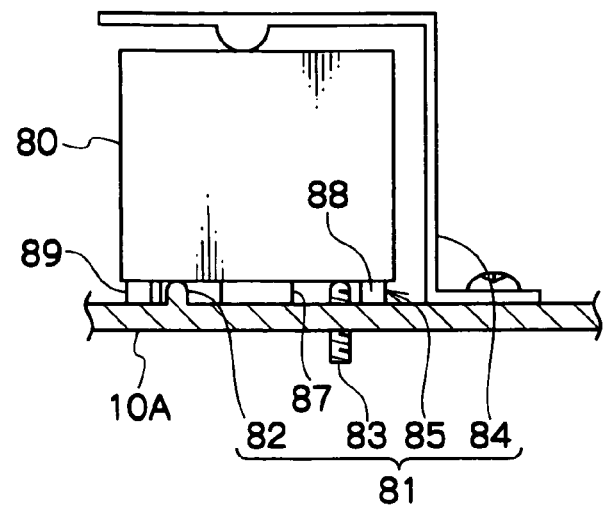
FIGS. 8A, 8B, and 8C show a sensor adjusting mechanism of a photosensor of the light scanning device according to the second exemplary embodiment.
Figure 8B:
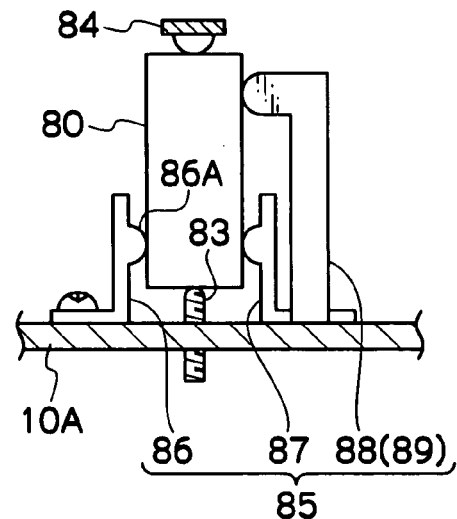
Figure 8C:
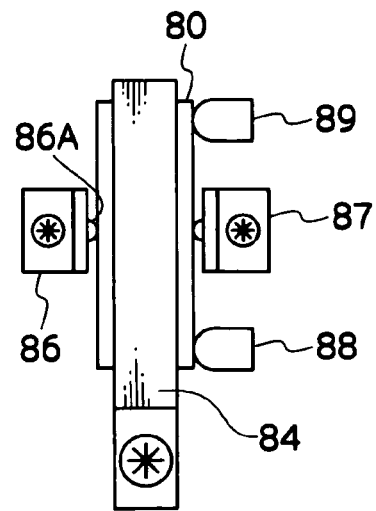

As shown in FIG. 7, in the light scanning device 100 of this exemplary embodiment, an anamorphic lens 80 is disposed in place of the above-described lens 49. As shown in FIGS. 8A to 8C, the anamorphic lens 80 is supported on the bottom surface 10A of the light scanning device housing so as to be rotatably adjusted around the optical axis by a lens adjusting mechanism 81. The lens adjusting mechanism 81 is configured by a positioning projection 82 that projects from the bottom surface 10A and faces the lower left side of the anamorphic lens 80, an adjustment screw 83 that projects from the bottom surface 10A and faces the lower right side of the anamorphic lens 80, a plate spring 84 that abuts against the upper surface of the anamorphic lens 80 such that the anamorphic lens 80 and the positioning projection 82 and the adjustment screw 83 are press-contacted, and a supporting mechanism 85 for supporting the anamorphic lens 80 so as not to be unable to incline in the optical axial direction.

The supporting mechanism 85 is configured by a support chip 86 on which a positioning projection 86A is formed so as to face a center part at the lower side of the surface of the anamorphic lens 80, a plate spring 87 that abuts against the center part at the lower side of the rear surface of the anamorphic lens 80 such that the anamorphic lens 80 and the positioning projection 86A are press-contacted, a supporting chip 88 on which a positioning projection 88A which faces the right upper side of the rear surface of the anamorphic lens 80 is formed, and a supporting chip 89 on which a positioning projection 89A which faces the left upper side of the rear surface of the anamorphic lens 80 is formed.

The anamorphic lens 80 is supported in a sandwich manner by the positioning projection 86A and the plate spring 87 at the lower center parts. In addition, the lower center part of the anamorphic lens 80 is biased from the rear side to the front side. When a moment from the front side to the rear side acts on the upper side of the anamorphic lens 80, the right upper side of the rear surface and the left upper side of the rear surface of the anamorphic lens 80 abut against the positioning projections 88A and 89A, respectively. Thereby, the anamorphic lens 80 cannot be inclined to the light axial direction.

In addition, the anamorphic lens 80 is supported in a sandwich manner by the positioning projection 82, the adjustment screw 83, and the platy spring 84 at the upper and lower surfaces thereof. Here, the adjustment screw 83 can adjust the projection amount thereof from the bottom surface 10A and by adjusting the projection amount from the bottom surface 10A of the adjustment screw 83, the anamorphic lens 80 can be rotatably adjusted around the optical axis.

Here, by adjusting the anamorphic lens 80 in a rotating manner, the imaging position of the light beam on the light receiving surface 50A of the photosensor 50 is adjusted, however, according to this exemplary embodiment, after plural light beams emitted from plural VCSELs 16A configuring the SOS detection group pass through the anamorphic lens 80, the inclined angle to the sub scanning direction of the row of the light beams is decreased, and further, the row of the light beams is adjusted to be made to be parallel to the longitudinal direction of the light receiving surface 50A of the photosensor 50.

Therefore, as compared to a case that the light beams are incident to the light receiving surface 50A of the photosensor 50 in a state in which the row of the light beams emitted from the plural VCSELs 16A configuring the SOS detection group is inclined to the sub scanning direction, a difference in timings that the plural light beams enter the light receiving surface 50A of the photosensor 50 is smaller. In the meantime, each member configuring the lens adjusting mechanism 81 is arranged so as not to intercept the light beams progressing to the photosensor 50 or the photoreceptor 46.

Thereby, when lighting all of the VCSELs 16A configuring the SOS detection group, as shown in the graph of FIG. 3, a difference in timings of rising and falling of the respective light beams is smaller and the received light energy profile of which maximum value is larger than the light emission energy of each VCSEL 16A is formed on the light receiving surface 50A. As a result, it is possible to have two cross points between the received light energy profile and the energy level corresponding to the threshold for generating the SOS signal without raising the amplification gain of the photodiode PD or lowering the threshold voltage.

Particularly, since the edge at the side of the upstream in the main scanning direction of the light receiving surface 50A is made to be parallel to the row of the light beams scaning the light receiving surface 50A, plural light beams emitted from the plural VCSELs 16A enter the light receiving surface 50A of the photosensor 50 at the same time. Thereby, a received light energy profile having rising and falling once, of which maximum value is plural times (for example, three times as shown in the drawing) as the light emission energy amount of each VCSEL is formed.

Accordingly, the stable SOS signal that is not easily affected by the noise can be generated by the photodetector for SOS signal detection 52, so that the accuracy for control of the scanning start position in the main scanning direction at the photoreceptor 46 can be improved.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A light scanning device comprising:
   a light source including a plurality of light emitting elements that are arranged linearly;
   a deflection section that deflects a plurality of light beams emitted from the light source to scan a surface to be scanned;
   a photosensor that receives at least one of the plurality of light beams that are deflected by the deflection section;
   a signal generation section that generates a signal when an amount of light energy received at the photosensor reaches a predetermined amount; and
   a control section that starts scanning of the surface to be scanned by each light beam after a predetermined amount of time passes from a point in time when the signal is generated by the signal generation section;
   wherein a light receiving surface of the photosensor is inclined so as to receive light beams emitted from at least two light emitting elements among the plurality of light emitting elements.

2. The light scanning device according to claim 1, wherein a longitudinal direction of the light receiving surface of the photosensor is made to be parallel to a row of the light emitting elements.

3. The light scanning device according to claim 1, further comprising a sensor adjustment section that adjusts an inclined angle with respect to a sub scanning direction by rotating the photosensor around an optical axis.

4. The light scanning device according to claim 1, further comprising a lens that has a positive power in a sub scanning direction and causes a deflection surface of the deflection section and the light receiving surface to have a conjugate relation.

5. The light scanning device according to claim 1, wherein a plurality of rows are formed at the light source, each of the rows having a plurality of light emitting elements arranged on a line inclined toward one side in a main scanning direction with respect to a sub scanning direction.

6. A light scanning device comprising:
   a light source including a plurality of light emitting elements that are arranged linearly;
   a deflection section that deflects a plurality of light beams emitted from the light source to scan a surface to be scanned;
   a photosensor that receives the plurality of light beams that are deflected by the deflection section;

an anamorphic lens disposed between the deflection section and the photosensor;

a lens adjustment section that adjusts incident positions of the light beams on a light receiving surface of the photosensor by rotating the anamorphic lens around an optical axis;

a signal generation section that generates a signal when an amount of light energy received at the photosensor reaches a predetermined amount; and a control section that starts scanning of the surface to be scanned by each light beam after a predetermined amount of time passes from a point in time when the signal is generated by the signal generation section;

wherein, through the adjustment by the lens adjustment section in which the anamorphic lens is rotated around the optical axis, the anamorphic lens converges the plurality of light beams deflected by the deflection section in a scanning direction at the light receiving surface of the photosensor to make the plurality of light beams incident on the light receiving surface of the photosensor.

7. The light scanning device according to claim 6, wherein a plurality of rows are formed at the light source, each of the rows having a plurality of light emitting elements arranged on a line inclined toward one side in a main scanning direction with respect to a sub scanning direction.

8. The light scanning device according to claim 7, wherein the lens adjustment section rotates the anamorphic lens around the optical axis such that a row of light beams emitted from the plurality of light emitting elements of the row is made to be parallel to a longitudinal direction of the light receiving surface of the photosensor.

9. A light scanning device comprising:

a light source including a plurality of light emitting elements that are arranged linearly;

a deflection section that deflects a plurality of light beams emitted from the light source to scan a surface to be scanned;

a photosensor that receives at least one of the plurality of light beams that are deflected by the deflection section;

a signal generation section that generates a signal when an amount of light energy received at the photosensor reaches a predetermined amount; and a control section that starts scanning of the surface to be scanned by each light beam after a predetermined amount of time passes from a point in time when the signal is generated by the signal generation section;

wherein a light receiving surface of the photosensor is inclined, and a peak of a waveform of the light energy received at the photosensor is higher than a peak of a waveform of light energy emitted from each of the plurality of light emitting elements of the light source.

10. A light scanning device comprising:

a light source including a plurality of light emitting elements that are arranged linearly;

a deflection section that deflects a plurality of light beams emitted from the light source to scan a surface to be scanned;

a photosensor that receives at least one of the plurality of light beams that are deflected by the deflection section;

a signal generation section that generates a signal when an amount of light energy received at the photosensor reaches a predetermined amount; and a control section that starts scanning of the surface to be scanned by each light beam after a predetermined amount of time passes from a point in time when the signal is generated by the signal generation section;

wherein a row of the light emitting elements is inclined toward one side in a scanning direction on a light receiving surface of the photosensor with respect to a sub scanning direction, and the light receiving surface of the photosensor is inclined toward the one side in the scanning direction on the light receiving surface with respect to the sub scanning direction.

11. The light scanning device according to claim 10, wherein a longitudinal direction of the light receiving surface of the photosensor is made to be parallel to the row of the light emitting elements.

12. The light scanning device according to claim 10, further comprising a sensor adjustment section that adjusts an inclined angle with respect to the sub scanning direction by rotating the photosensor around an optical axis.

13. The light scanning device according to claim 10 further comprising a lens that has a positive power in the sub scanning direction and causes a deflection surface of the deflection section and the light receiving surface to have a conjugate relation.

14. The light scanning device according to claim 6, wherein the lens adjustment section supports the anamorphic lens such that the anamorphic lens is rotatable around the optical axis.

* * * * *